United States Patent
Jung et al.

(10) Patent No.: US 9,760,189 B2
(45) Date of Patent: Sep. 12, 2017

(54) METHOD AND APPARATUS FOR CONTROLLING TOUCH-KEY OPERATION

(71) Applicant: Samsung Electronics Co., Ltd., Gyeonggi-do (KR)

(72) Inventors: Byung-Min Jung, Seoul (KR); Dong-Woo Kim, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 81 days.

(21) Appl. No.: 14/160,769

(22) Filed: Jan. 22, 2014

(65) Prior Publication Data

US 2014/0218318 A1    Aug. 7, 2014

(30) Foreign Application Priority Data

Feb. 7, 2013   (KR) .................. 10-2013-0013759

(51) Int. Cl.
*G06F 3/038*  (2013.01)
*G06F 3/0488* (2013.01)
*G06F 3/041*  (2006.01)

(52) U.S. Cl.
CPC ............ *G06F 3/038* (2013.01); *G06F 3/0416* (2013.01); *G06F 3/04886* (2013.01); *G06F 2203/04108* (2013.01)

(58) Field of Classification Search
CPC ................. G06F 3/038; G06F 3/04886; G06F 2203/04108
See application file for complete search history.

(56) References Cited

U.S. PATENT DOCUMENTS

| | | |
|---|---|---|
| 2006/0109252 A1 | 5/2006 | Kolmykov-Zotov et al. |
| 2007/0128899 A1 | 6/2007 | Mayer |
| 2012/0050211 A1* | 3/2012 | King et al. ............... 345/174 |
| 2012/0105362 A1* | 5/2012 | Kremin ............ G06F 3/03545 345/174 |
| 2012/0158629 A1 | 6/2012 | Hinckley et al. |
| 2012/0169663 A1 | 7/2012 | Kim et al. |
| 2012/0262407 A1 | 10/2012 | Hinckley et al. |
| 2013/0069903 A1* | 3/2013 | Geiger et al. ............ 345/174 |
| 2014/0132551 A1* | 5/2014 | Bathiche ............ G06F 3/0488 345/174 |
| 2014/0192004 A1* | 7/2014 | Andersson ........... G06F 3/0237 345/173 |

FOREIGN PATENT DOCUMENTS

KR   10-2006-0028787 A    4/2006

OTHER PUBLICATIONS

European Search Report dated Oct. 19, 2016.

* cited by examiner

*Primary Examiner* — Ilana Spar
*Assistant Examiner* — Mihir K Rayan
(74) *Attorney, Agent, or Firm* — Cha & Reiter, LLC.

(57) ABSTRACT

A method and apparatus for controlling a touch-key operation are provided, in which upon generation of an input event from an electronic pen, at least one touch key is deactivated, and upon generation of a hovering event in a predetermined area of the touch screen from the electronic pen, a predetermined touch key corresponding to the predetermined area is activated from among the at least one deactivated touch key.

17 Claims, 9 Drawing Sheets

METHOD AND APPARATUS FOR CONTROLLING TOUCH-KEY OPERATION

CLAIM OF PRIORITY

This application claims priority under 35 U.S.C. §119(a) to a Korean Patent Application filed in the Korean Intellectual Property Office on Feb. 7, 2013 and assigned Serial No. 10-2013-0013759, the contents of which are incorporated herein by reference.

BACKGROUND

1. Technical Field

The present disclosure relates generally to a portable electronic device having a touch screen and touch keys, and more particularly, to a method and apparatus for controlling a touch-key operation to enhance the convenience of applying a touch input by a pen touch or a finger touch.

2. Description of the Related Art

Recently, touch screens have been widely used in display devices, for allowing a user to input information by directly touching a screen with a finger or an electronic pen. A touch screen is a well-known input means with which a user touches a specific point on a display screen instead of a keyboard, a mouse, or a physical button, so that information about the position of the touched point is input. Thus the touch screen can provide a convenient, intuitive User Interface (UI).

Touch screens are used for portable electronic devices such as a smart phone, a portable phone, a tablet PC, etc. Such a portable device may include dedicated virtual touch keys. The touch keys are a type of UI provided separately from the touch screen to enable a user to intuitively execute a basic function such as menu, back, cancel, etc. through a touch input.

A related art technology involving control of a touch-key operation is disclosed in co-pending Korea Patent Publication No. 10-2012-0015968 (title: "Method and Apparatus for Preventing Touch Malfunction of a Portable Terminal", inventors: Kim Hee-Duck, Lee Su-Kyong, and Lee Seung-Won, applicant: Samsung Electronics Co., Ltd, and filed on Feb. 22, 2012). That application discloses a technique of preventing a touch malfunction caused by touching a part of a touch screen adjacent to a touch key while also touching the touch key. Specifically, as the part of the touch screen adjacent to the touch key is touched while the touch key is also touched, an operation corresponding to the touch input to the touch screen is performed but a function corresponding to the touch key is not performed. The document discloses a technique of preventing this malfunction.

In related art technology involving control of a touch-key operation, electronic pen inputs are recognized by sensing hovering of the electronic pen, while an operation corresponding to a touch key pressed by a hand is ignored. This technology has been applied to consumer products and prevents errors caused by an unintended palm touch input to a touch key, during input of an electronic pen touch.

Figure 1:
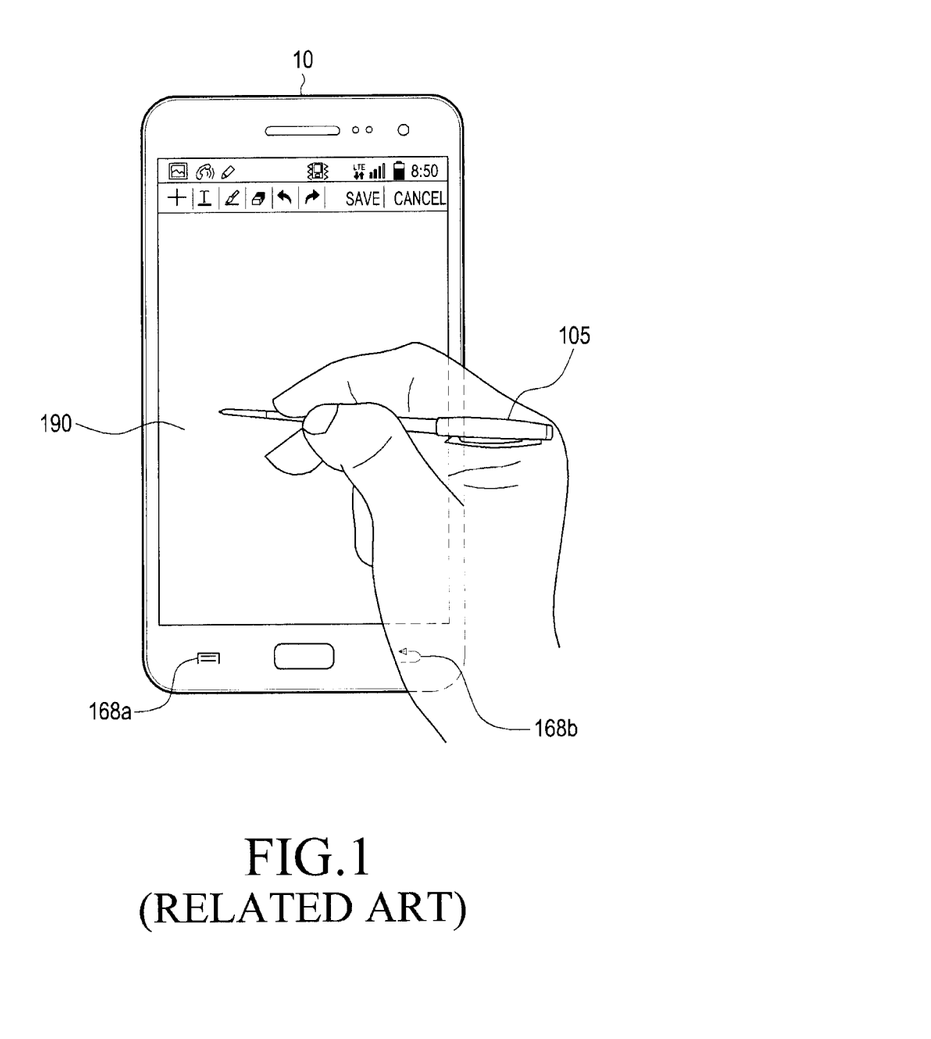
FIG. 1 is an exemplary plan view illustrating a touch input applied to a touch screen using an electronic pen in a related art portable device.
Figure 2:
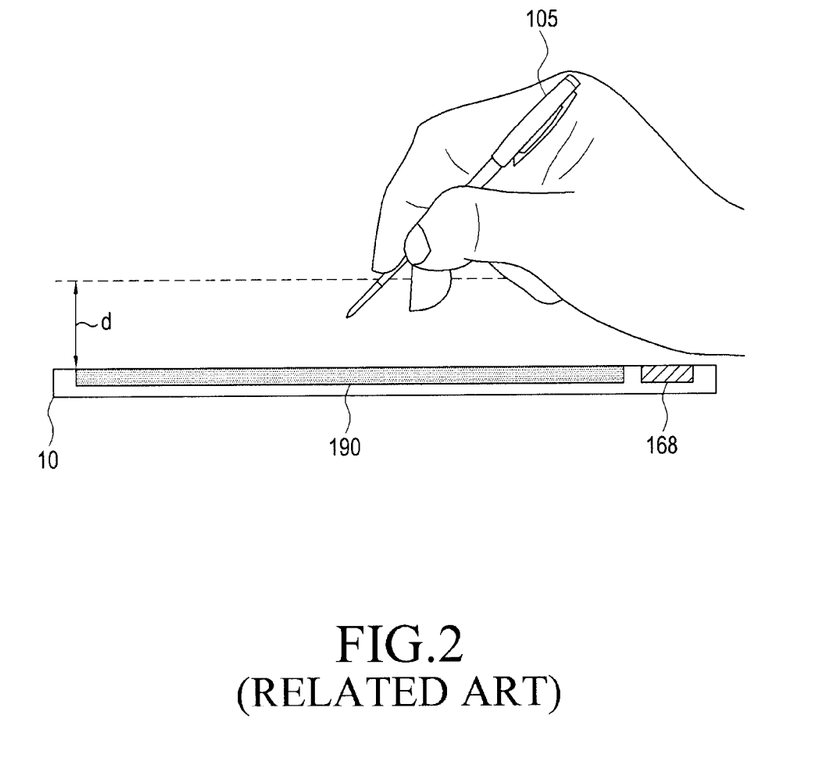
FIG. 2 is a side view illustrating the touch input applied to the touch screen using the electronic pen in the portable device illustrated in FIG. 1.

FIG. 1 is a plan view of a conventional smart phone device, 10, for which a user manipulates an electronic pen 105 to generate user inputs. FIG. 2 is side view of the device 10 as the user operates it with the electronic pen. A user may unintentionally touch a touch key 168a or 168b at the bottom of a touch screen 190 with his palm while writing on the touch screen 190 with the pen 105. When this happens, the touched key (e.g., the back key 168b) operates unintentionally. Thus a hand touch on one of the touch keys 168a, 168b triggers an unintended operation in many cases while the user writes a note using the electronic pen 105.

To overcome the above problem in a related art solution, when the electronic pen 105 approaches within a hovering recognition distance d of the electronic pen 105, the touch keys 168a, 168b are deactivated. Therefore, even if they're touched under the hovering condition, the touches do not result in corresponding operations and touch malfunction is prevented.

Figures 3A, 3B:
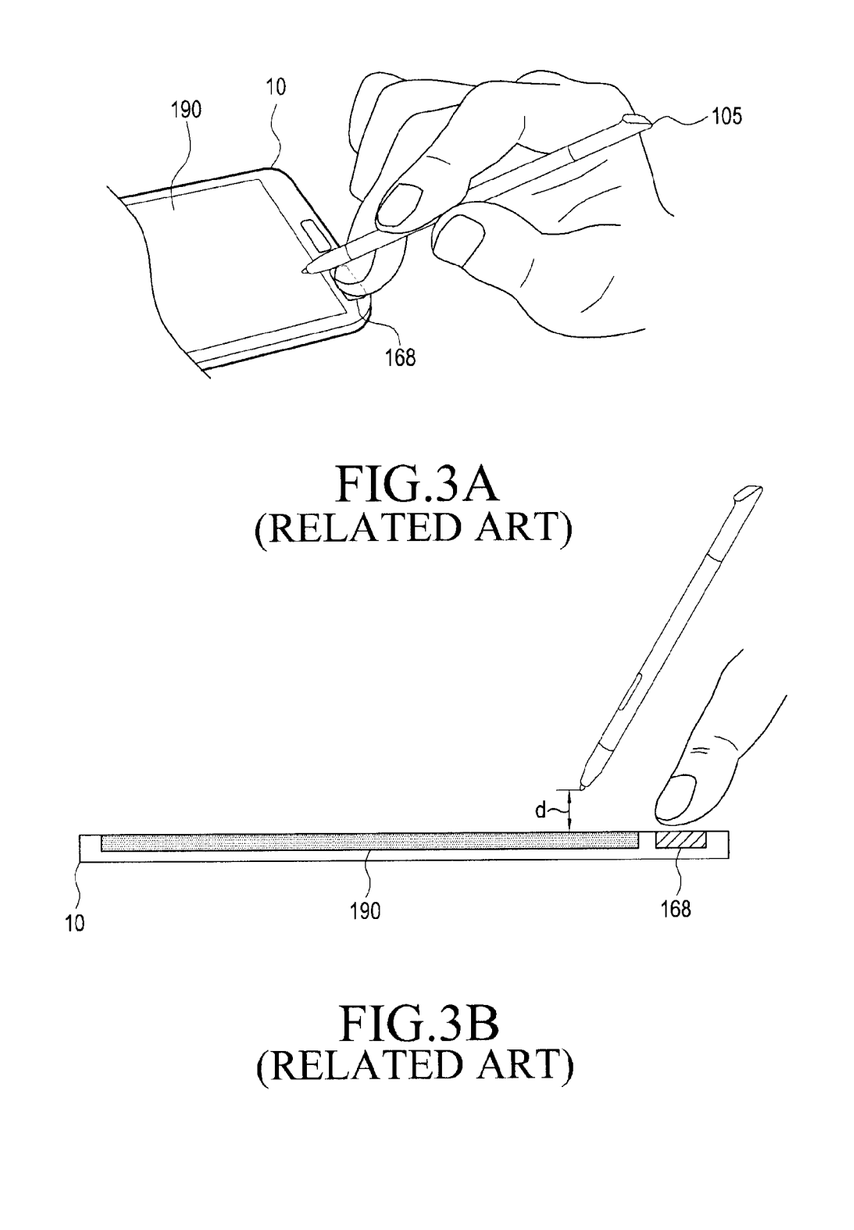
FIG. 3A and FIG. 3B are perspective and side views, respectively, illustrating a hand touch input to a touch key, while an electronic pen is held in the same hand in the related art portable device.

As just described, the touch malfunction caused by a palm touch is more or less mitigated by the technique of ignoring a touch-key operation when sensing hovering of the electronic pen. However, this technique may cause another malfunction as illustrated in FIGS. 3A and 3B: when the user touches the touch key 168a or 168b with his finger to intentionally operate it, and simultaneously holds the electronic pen 105, the pen 105 may be within the hovering recognition distance d. As a consequence, the hovering of the electronic pen is recognized and thus the function of the touch key is not executed. In other words, in the case where the user touches the touch key with his or her finger, and concurrently holds the electronic pen, if the electronic pen enters a hovering recognition area, a user-intended touch-key operation may be ignored.

SUMMARY

Embodiments disclosed herein are designed to enhance the convenience of a touch input to a portable electronic device. Particularly, an aspect is to activate a touch key, when a user hand touches the touch key while concurrently holding an electronic pen in the same hand, while maintaining the effect of the conventional technology that prevents a hand-touch operation while applying a touch input with the electronic pen.

In accordance with an embodiment of the present invention, there is provided a method for controlling a touch-key operation in an electronic device having a touch screen and at least one touch key outside an area of the touch screen. Upon generation of an input event from an electronic pen, a touch key is deactivated. Upon generation of a hovering event in a predetermined area of the touch screen from the electronic pen, the touch key is activated.

At least first and second touch keys may be provided, such as menu and back keys, and first and second predetermined areas in proximity to the touch keys may be defined to correspond to the first and second touch keys. The first and second touch keys may be activated when a hovering event is recognized in the first and second areas, respectively.

In accordance with another embodiment of the present invention, there is provided an apparatus for controlling a touch-key operation in an electronic device having a touch screen. A touch key performs a predetermined function in response to a touch input, and a controller controls the touch screen and the function of the touch key, deactivates the touch key, upon generation of an input event from an electronic pen, and activates the touch key upon generation of a hovering event in a predetermined area of the touch screen from the electronic pen, the predetermined area corresponding to the touch key.

In another embodiment, a method for controlling a touch-key operation in an electronic device having a touch screen and a touch key outside the touch screen is provided. A predetermined area of the touch screen is defined, where the area is associated with the touch key. The touch key is deactivated upon the generation of an input event from an electronic pen outside the predetermined area of the touch screen. The touch key is activated when the input event is no longer generated and when a hovering event is generated from the electronic pen in the predetermined area of the touch screen.

BRIEF DESCRIPTION OF THE DRAWINGS

The above and other objects, features and advantages of certain embodiments of the present invention will be more apparent from the following detailed description taken in conjunction with the accompanying drawings, in which.

Throughout the drawings, the same or like drawing reference numerals will be understood to refer to the same or like elements, features and structures.

DETAILED DESCRIPTION

Reference will be made to exemplary embodiments of the present invention with reference to the attached drawings. Specific details including components and names such as a first area, a second area, a left touch key, and a menu key are given in the following description. While the specific details are provided to help comprehensive understanding of the present invention, they should be considered purely exemplary. Therefore, those skilled in the art will understand that the embodiments of the present invention can be practiced with many variations and modifications made to the specific details within the scope and spirit of the present invention.

It is to be understood that the singular forms "a," "an," and "the" include plural references unless the context clearly dictates otherwise. Thus, for example, a reference in the claims section to "a touch key" includes reference to one or more of such touch keys.

As used herein, the terms "his" and "her" are used for convenience to refer to any user, and are not intended to be gender specific.

Figure 4:
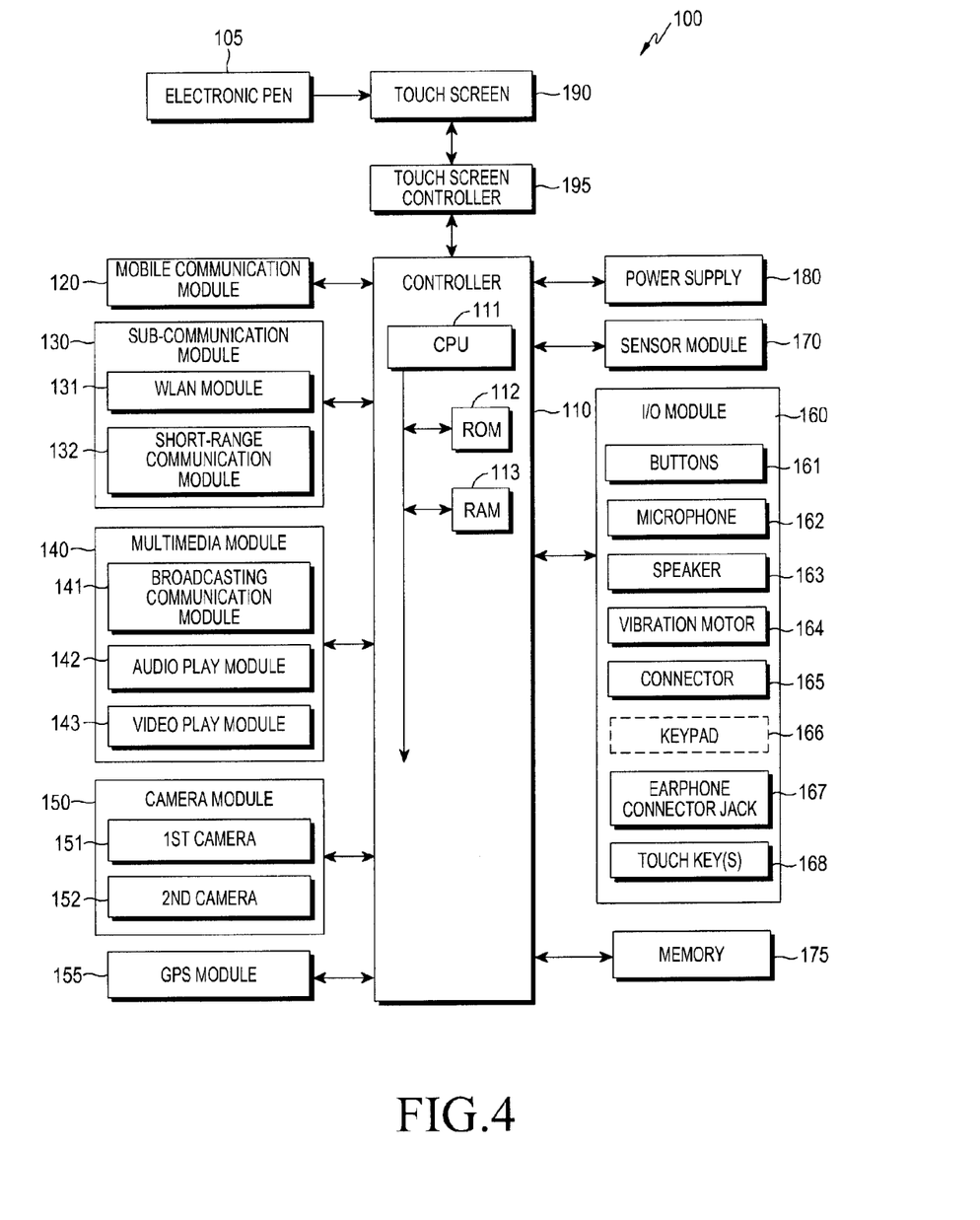
FIG. 4 is a block diagram of a portable electronic device configured to control a touch-key operation according to an embodiment of the present invention.

FIG. 4 is a block diagram of a portable electronic device 100, exemplified as a smart phone, and configured to control a touch-key operation according to an embodiment of the present invention. Example device 100 (equivalently, "portable terminal") includes a display 190, a display controller 195, a controller 110, a mobile communication module 120, a sub-communication module 130, a multimedia module 140, a camera module 150, a Global Positioning System (GPS) module 155, an Input/Output (I/O) module 160, a sensor module 170, a memory 175, and a power supply 180.

Multimedia module 140 includes at least one of a broadcasting communication module 141, an audio play module 142, and a video play module 143. The camera module 150 includes at least one of a first camera 151 and a second camera 152. The I/O module 160 includes touch keys 168 and further includes at least one of buttons 161, a microphone 162, a speaker 163, a vibration motor 164, a connector 165, a keypad 166, and an earphone connector jack 167. The following description is given with the appreciation that the display 190 and the display controller 195 are a touch screen and a touch screen controller 195, respectively, by way of example.

The mobile communication module 120 connects the portable device 100 to an external device through one or more antennas (not shown) by mobile communication under the control of the controller 110. The mobile communication module 120 transmits wireless signals to or receives wireless signals from a third party device (not shown), e.g., another portable phone, a smart phone, a tablet PC, or another portable device that has a phone number input to device 100, for voice call, video call, Short Message Service (SMS), or Multimedia Messaging Service (MMS).

The sub-communication module 130 may include at least one of the WLAN module 131 and the short-range communication module 132. The WLAN module 131 may be connected to the Internet in a place where a wireless AP (not shown) is installed, under the control of the controller 110. The WLAN module 131 supports the WLAN standard of the Institute of Electrical and Electronics Engineers (IEEE), IEEE802.11x. The short-range communication module 132 may conduct short-range wireless communication for the portable terminal 100 under the control of the controller 110. Portable device 100 may include at least one of the mobile communication module 120, the WLAN module 131, and the short-range communication module 132 according to its capabilities. For example, the portable terminal 100 may include a combination of the mobile communication module 120, the WLAN module 131, and the short-range communication module 132 according to its capabilities.

The multimedia module 140 may include the broadcasting communication module 141, the audio play module 142, or the video play module 143. The broadcasting communication module 141 may receive a broadcast signal (for example, a TV broadcast signal, a radio broadcast signal, or a data broadcast signal) and additional broadcasting information (for example, an Electronic Program Guide (EPG) or Electronic Service Guide (ESG)) from a broadcasting station through a broadcasting communication antenna (not shown) under the control of the controller 110. The audio play module 142 may play a stored or received digital audio file (for example, a file having such an extension as mp3, wma, ogg, or way) under the control of the controller 110. The video play module 143 may play a stored or received digital video file (for example, a file having such an extension as mpeg, mpg, mp4, avi, mov, or mkv) under the control of the controller 110. The video play module 143 may also play a digital audio file. It is noted that in alternative constructions, one or more of modules 141, 142 and 143 may be incorporated into the controller 110.

The camera module 150 may include at least one of the first camera 151 and the second camera 152, for capturing a still image or a video under the control of the controller 110.

The GPS module 155 may receive signal waves from a plurality of GPS satellites (not shown) in Earth orbit and calculate a position of the portable terminal 100 based on the Time of Arrivals (ToAs) of satellite signals from the GPS satellites to the portable terminal 100.

The I/O module 160 includes a touch key or keys 168, which is preferably a set of virtual keys touchable through a glass surface integral with the front surface of touch screen 190. The I/O module 160 may further include at least one of a plurality of buttons 161, the microphone 162, the speaker 163, the vibration motor 164, the connector 165, the keypad 166, and the earphone connector jack 167.

The touch key 168(s) is a type of User Interface (UI) configured separately from the touch screen 190, for allowing a user to intuitively execute a basic function such as menu, back, cancel, etc. through a touch input of the user's body part (e.g. a finger like a thumb, hereinafter referred to as a hand touch).

The touch key 168(s) may be disposed on a front surface of a housing in the vicinity of the touch screen 190 in the portable device 100. The touch key 168(s) may be at least one of a menu key, a back key, and a cancel key. In examples described below, touch key(s) 168 is embodied as a menu key 168*a* and a back key 168*b*. For example, the menu key 168*a* and the back key 168*b* may be disposed at bottom left-hand and right-hand corners proximate the touch screen 190 in the portable device 100. Here, the bottom left and right corners denote left and right corners when device 100, which may have a generally solid rectangular shape with width dimension shorter than length dimension, is held in a normal operating position where the left and right sides are the long sides, as shown e.g. in FIG. 5. In any event, in alternative embodiments, the menu and back keys can be disposed in other locations, but preferably along the perimeter of device 100. A touch input may be applied to the touch key 168 by a hand touch. As shown, e.g., in the portable device 10 of FIG. 2, which can be considered to have the same physical characteristics of the portable device 100, the touch key 168(s) can be embodied within a touch sensitive area separate from the touch screen 190. However, the key(s) 168 and touch screen 190 can share the same front screen glass. That is, a single glass cover can cover both the touch sensitive areas of touch screen 190 and key(s) 168, and when the device 100 is turned off, the key(s) 168 can be indistinguishable from the touch screen 190. It is further noted, in an alternative implementation, the key(s) 168 can be designed as part of the touch screen 190, i.e., the controller can designate a certain portion of the touch screen 190 dedicated for the key(s) 168, such that the corresponding function is executed whenever the designated location on the touch screen 190 is touched.

The buttons 161 may be formed physically on the front surface, a side surface, or the rear surface of the housing of the portable terminal 100, and may include at least one of a power/lock button (not shown), a volume button (not shown), a home button, and a search button.

The microphone 162 receives voice or sound and converts the received voice or sound to an electrical signal under the control of the controller 110.

The speaker 163 outputs sounds from the portable device 100 corresponding to various signals (for example, a wireless signal, a broadcast signal, a digital audio file, a digital video file, a photo shot, etc.) received from the mobile communication module 120, the sub-communication module 130, the multimedia module 140, and the camera module 150. The speaker 163 may output sounds corresponding to functions (for example, a button manipulation sound or a ringback tone for a call) performed by the device 100. One or more speakers 163 may be disposed at an appropriate position or positions of the housing of the device 100.

The vibration motor 164 may convert an electrical signal to a mechanical vibration under the control of the controller 110. For example, when the portable device 100 receives an incoming voice call from another device (not shown) in vibration mode, the vibration motor 164 operates. One or more vibration motors 164 may be mounted inside the housing of the device 100. The vibration motor 164 may operate in response to a user's touch on the touch screen 190 and a continuous movement of the touch on the touch screen 190.

The connector 165 may be used as an interface for connecting the portable device 100 to an external device (not shown) or a power source (not shown). Device 100 may transmit data stored in the memory 175 to an external device (not shown) via a cable connected to the connector 165 or may receive data from the external device via the cable, under the control of the controller 110. Device 100 may receive power or charge a battery (not shown) from a power source (not shown) via the cable connected to the connector 165.

The keypad 166 may receive a key input from the user to control the portable terminal 100. The keypad 166 includes a physical keypad (not shown) formed in the portable terminal 100 or a virtual keypad (not shown) displayed on the touch screen 190. The physical keypad may not be provided according to the capabilities or configuration of the portable terminal 100.

An earphone (not shown) may be inserted into the earphone connector jack 167 and thus connected to the portable terminal 100.

The sensor module 170 includes at least one sensor for detecting a state of the portable device 100. For example, the sensor module 170 may include a proximity sensor for detecting whether the user is close to device 100, a motion sensor (not shown) for detecting a motion of device 100 (for example, rotation, acceleration or vibration of device 100), an illuminance sensor (not shown) for detecting the amount of ambient light around the device 100, a geomagnetic sensor (not shown) for detecting a point of the compass using the earth's magnetic field, a gravity sensor for detecting the direction of gravity, and an altimeter for detecting an altitude by measuring the air pressure. At least one sensor may detect a state of the device 100 and transmit a signal corresponding to the detected state to the controller 110. A sensor may be added to or removed from the sensor module 170 according to designed capabilities of device 100.

The power supply 180 may supply power to one or more batteries (not shown) mounted in the housing of the portable device 100 under the control of the controller 110, where the one or more batteries supply power to device 100. Further, the power supply 180 may supply power received from an external power source (not shown) via the cable connected to the connector 165 to the portable device 100. The power supply 180 may also supply power received wirelessly from the external power source to device 100 by a wireless charging technology.

The memory 175 may store input/output signals or data in accordance with operations of the mobile communication module 120, the sub-communication module 130, the multimedia module 140, the camera module 150, the GPS module 155, the I/O module 160, the sensor module 170, and the touch screen 190 under the control of the controller 110. The memory 175 may store a control program for controlling the portable terminal 100 or the controller 110, and applications.

The term "memory" covers the memory 175, the ROM 112 and the RAM 113 within the controller 110, or a memory card (not shown) (e.g. a Secure Digital (SD) card or a memory stick) mounted to the portable terminal 100. The memory may include a non-volatile memory, a volatile memory, a Hard Disk Drive (HDD), or a Solid State Drive (SSD).

The touch screen 190 may receive an input corresponding to a user manipulation and display an execution image, operation state, and menu state of an application program. That is, the touch screen 190 may provide UIs corresponding to various services (for example, call, data transmission, broadcasting, and photo taking) to the user. The touch screen 190 may transmit an analog signal corresponding to at least one touch on a UI to the touch screen controller 195. The touch screen 190 may receive a hand touch input or at least one touch input of a touch input tool such as the electronic pen 105 (for example, a stylus pen, hereinafter, referred to as the electronic pen 105). Also, the touch screen 190 may receive a touch input signal corresponding to a continuous movement of a touch from among one or more touches. The touch screen 190 may transmit an analog signal corresponding to the continuous movement of the input touch to the touch screen controller 195.

The touch screen 190 may be configured as, for example, a resistive type, a capacitive type, an ElectroMagnetic Resonance (EMR) type, an infrared type, or an acoustic wave type.

In the present invention, a "touch" may be a direct touch on the touch screen 190 or a "non-contact touch," also referred to as a "proximity" or "hovering event" of an object such as the electronic pen 105 in near the touch screen 190 surface. A gap size detectable on the touch screen 190, i.e., a distance between the touch screen surface and an object proximate to the surface, may be a function of the designed capabilities or configuration of the portable device 100. Further, the touch screen 190 may be configured to output different values (e.g. different current values) for a touch event and a hovering event, so that the touch event caused by a hand touch or a contact with the electronic pen 105 may be distinguished from the hovering event, the latter being an example of a non-contact input. In addition, the touch screen 190 preferably outputs a different value (e.g. a different current value) according to the distance between the touch screen 190 surface and the electronic pen when a hovering event occurs.

The touch screen controller 195 converts an analog signal received from the touch screen 190 to a digital signal (for example, X and Y coordinates). The controller 110 may control the touch screen 190 using the digital signal received from the touch screen controller 195. For example, the controller 110 may control selection or execution of a shortcut icon (not shown) displayed on the touch screen 190 in response to the touch event or the hovering event. The touch screen controller 195 is shown separate from controller 195; alternatively, it may be incorporated into controller 110.

The touch screen controller 195 may determine the distance between a hovering event generation space and the touch screen 190 by a value (e.g. a current value) received from the touch screen 190, convert the determined distance value to a digital signal (e.g. a Z coordinate), and provide the digital signal to the controller 110.

The touch screen 190 may include at least two touch screen panels for recognizing a hand touch and a touch or proximity of the electronic pen, respectively, to simultaneously receive a hand touch input and an input of the electronic pen 105. The at least two touch screen panels may provide different output values to the touch screen controller 195. In this manner the touch screen controller 195 may identify whether an input from the touch screen 190 is a hand touch input or an input of the electronic pen 105 by distinguishing the output values of the at least two touch screen panels.

The controller 110 may include a Central Processing Unit (CPU) 111, a Read Only Memory (ROM) 112 for storing a control program to control the portable terminal 100, and a Random Access Memory (RAM) 113 for storing signals or data received from the outside of the portable terminal 100 or for use as a memory space for an operation performed by the portable terminal 100. The CPU 111 may include a single core, dual cores, triple cores, or quad cores. The CPU 111, the ROM 112, and the RAM 113 may be connected to one another through an internal bus.

The controller 110 may control the mobile communication module 120, the sub-communication module 130, the multimedia module 140, the camera module 150, the GPS module 155, the I/O module 160, the sensor module 170, the memory 175, the power supply 180, the touch screen 190, and the touch screen controller 195.

According to the features of the present invention regarding control of a touch-key operation, the controller 110 may control deactivation of an operation of the at least one touch key 168, upon generation of an input event from the electronic pen 105, and release of an operation of a predetermined touch key 168 corresponding to a predetermined area among the at least one deactivated touch key 168 from an inactive state, upon generation of a hovering event in the predetermined area from the electronic pen 105. These operations will become more apparent in light of the explanation below.

In the presence of two or more touch keys 168, the controller 110 may control deactivation of all of the touch keys 168, upon generation of an input event from the electronic pen 105.

Figure 5:
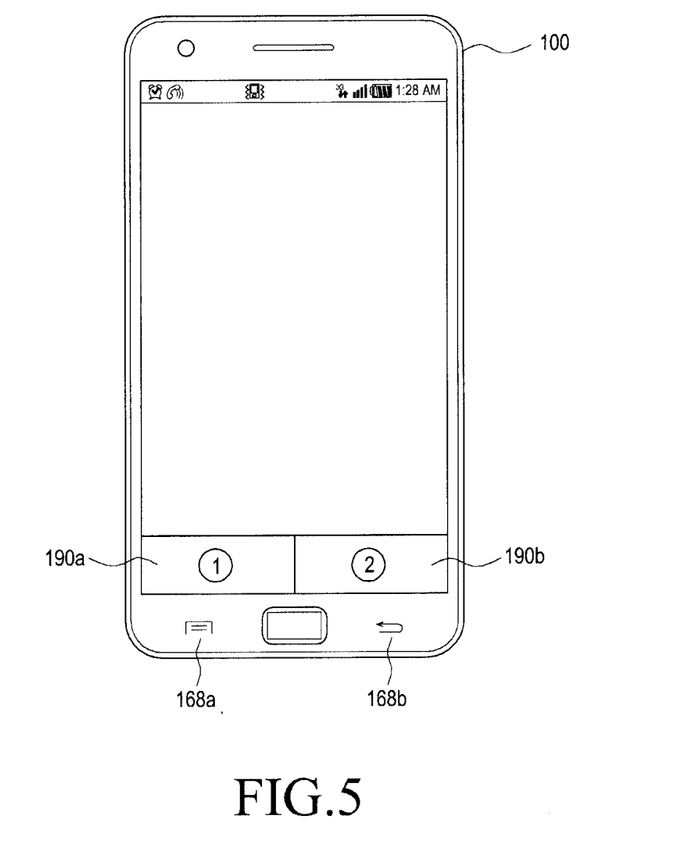
FIG. 5 illustrates an exemplary touch screen in which touch keys and touch key-related areas are defined separately in the portable device of FIG. 4 according to an embodiment of the present invention.

FIG. 5 illustrates an exemplary front surface of portable device 100 and defined touch areas according to an embodiment of the present invention. The front surface includes touch keys 168 which are separate from the touch screen 190. Touch screen 190 includes touch key-related areas separately defined in the portable device 100 for controlling a touch-key operation. In this example, there are two touch keys 168, that is, a menu key 168a and a back key 168b. The menu key 168a and back key 168b are disposed respectively at bottom left-hand and right-hand corners adjacent the touch screen 190. In addition, two touch key-related areas are defined by controller 110 on the touch screen 190. These are a first area 190a related to the menu key 168a, defined in a part of the touch screen 190 directly above the menu key

168a, and a second area 190b related to the back key 168b, defined in a part of the touch screen 190 directly above the back key 168b.

In accordance with the principles herein, if a right handed user holds the electronic pen 105 in an electronic pen input mode such as a handwriting input mode, when the user writes upon or hovers over most parts of the touch screen 190 surface (i.e., a touch event is generated), it is likely that her palm, pinky or ring finger will make contact with the touch key 168b in the lower right hand corner. Therefore, when the touch event is generated, it is beneficial to deactivate the key 168b to prevent inadvertent key touch operations. On the other hand, when the user intentionally touches key 168b while continuing to hold the pen 105, it is typical for the pen 105 to hover in the area 190b directly above key 168b. Under this condition, therefore, it is desirable to activate the key 168b so that the intentional touch key contact is recognized, and to ignore the hovering input in area 190b.

In light of these principles, in the method to be described in further detail below, when the electronic pen is first detected to contact or hover over any area of touch screen 190, key 168b is deactivated. Thereafter, if the pen 105 is detected to hover in area 190b, the key 168b is activated. Key 168b is also activated if the pen 105 is no longer detected hovering or contacting any touch screen area outside region 190b (i.e., if the user moves the pen away from the touch screen 190).

For left handed users, the problem is not as acute with regard to key 168b, but unintentional touches may still occur on this key. Likewise, for right handed users, unintentional touches may occur on key 168a, albeit not as frequently as for the right side key 168b. The method, however, need not discriminate between lefties and righties because the predetermined area 190a is defined to correspond to key 168a. When a righty or lefty intentionally touches key 168a while holding the pen 105, the pen 105 typically hovers in the area 190a directly above key 168a; therefore, the method activates key 168a when such hovering in area 190a is detected, and ignores the hovering input when the key 168a is simultaneously contacted. In other words, the hovering is assumed to be unintentional if the key 168a is simultaneously touched. For example, when the hovering input is generated in an instant, while the touch inputs in the first area 190a or the second area 190b, the hovering input is assumed to be unintentional, so the hovering input is ignored. In other words, when the hovering event is detected for a predetermined short time, while the touch event is generated in a predetermined area of the touch screen associated with the touch key, the detected hovering event is ignored.

Further, optimized boundaries for areas 190a, 190b can be determined experimentally, where the experiments can be done generally for a given portable device design and/or tailored for individual users. A calibration option can be included in a settings menu or the like, in which the user is prompted to touch keys 168a and 168b while holding the pen 105 normally. As each user may hold the electronic pen 105 differently, pen hovering positions may vary from user to user, thus, a calibration procedure tailored for each user allows for optimized boundaries with input errors minimized. For instance, different boundaries for areas 190a, 190b may be established for righties vs. lefties, or for users who hold the pen between their index and middle fingers vs. those who hold the pen between their middle and ring fingers. Another experiment/calibration can be performed in which the user is prompted to write a note along the entire touch screen, and while this occurs, inadvertent touches on the keys 168a, 168b are monitored. Examples of such experiments and calibrations are described below.

The two touch key-related areas 190a, 190b may be predefined on the touch screen 190 based on the results of the following simulations, as illustrated in FIGS. 6A to 8.

Figure 6A:
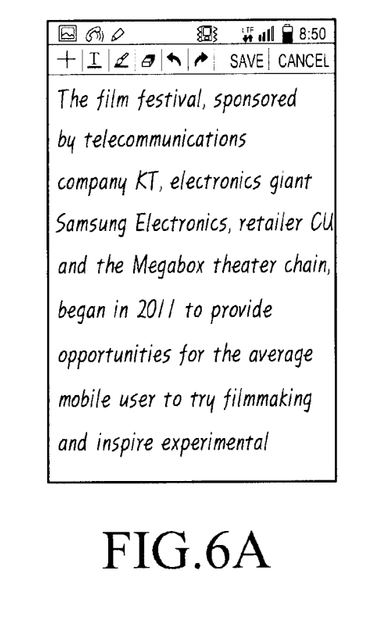
FIG. 6A and FIG. 6B are an exemplary view illustrating an operation for determining a part requiring deactivation of a touch-key operation according to an embodiment of the present invention.
Figure 6B:
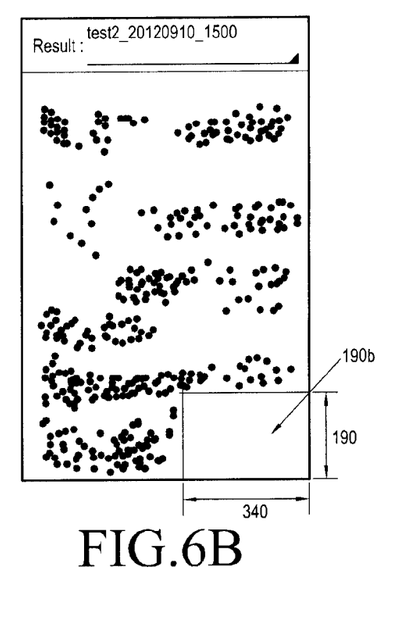

Referring to FIGS. 6A and 6B, a first simulation monitors inadvertent key touches on key 168b with the user's hand while writing a note on the touch screen with the same hand as that using the electronic pen 105.

The first simulation can be performed for the purpose of determining touch input points of the electronic pen on the touch screen during note writing, when a user simultaneously and inadvertently touches a touch key with the same hand during the touch input of the electronic pen on the touch screen. In the first simulation, in the case where the user inadvertently presses a touch key during writing on the touch screen with the electronic pen, the distribution of the coordinates of points touched by the electronic pen is checked. When the user writes a note with the electronic pen held in the right hand as illustrated in FIG. 6A, if the right touch key (i.e. the back key 168b) is activated, the touched points of the electronic pen at which inadvertent touches on key 168b are made are distributed on the touch screen as illustrated in FIG. 6B. As noted from FIG. 6B, when the electronic pen applies touch inputs to the touch screen, a wrong input caused by an unintended hand touch on a touch key does not occur in a part of the touch screen, that is, the second area 190b. Thus, the second area 190b does not require touch key deactivation, while the electronic pen is in use.

With the observation that no wrong input is caused when the user is writing with the pen in area 190b (e.g., due to the fact that the user's palm typically lifts off the key 168b), then it can be concluded that if, in practice, a hand touch is detected on the key 168b at the same time that a hovering event occurs in area 190b, then the hovering event is most likely an inadvertent hovering that occurs as the user is intentionally touching the key 168b. Thus, when the hovering is detected in area 190b, a method in accordance with the invention activates the key 168b. Meanwhile, the simulation in FIGS. 6A and 6B can be used to help define the boundary of area 190b. A similar simulation can be performed with respect to the left hand key 168a as a left handed person is writing a note, to define the first area 190a.

In a simulation of activating the left touch key (i.e. the menu key 168a) during writing a note with the electronic pen held in the right hand as illustrated in FIG. 6A, it is similarly observed that the first area 190a of the touch screen 190 above the left touch key (i.e. the menu key 168a) does not require touch key deactivation while the electronic pen is in use. Similar results to those of the above simulations are achieved from a case of taking a note using an electronic pen in the left hand.

A second simulation can be performed for the purpose of checking a hovering recognition distribution of the electronic pen above the touch screen, in the case where the user intentionally touches a touch key with her hand while holding the electronic pen in the same hand. That is, the hovering recognition pattern of the electronic pen under this condition is checked by repetitively writing a note on the touch screen with the electronic pen and purposely touching the touch key with the same hand, as when intending to make a key input, while continuing to hold the pen. As the touch keys 168a, 168b are touched, the touch screen points at which unintentional hovering inputs of the pen are detected. This calibration type operation is one way to determine suitable boundaries for the areas 190*a*, 190*b*.

Figure 7A:
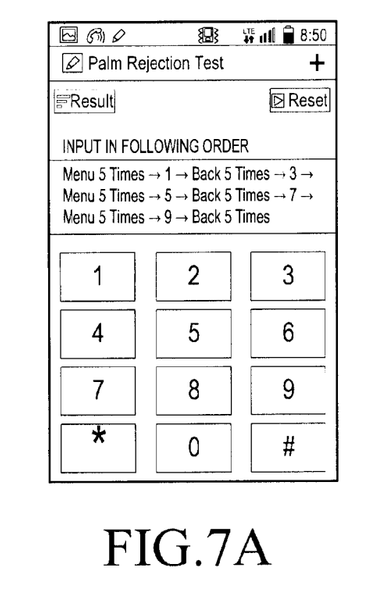
FIG. 7A and FIG. 7B are an exemplary view illustrating an operation for determining a hovering recognition area of an electronic pen in the case when a user hand touches a touch key and holds the electronic pen in the same hand.

In an example, referring to FIG. 7A, the user may repeat selection of a number displayed on the touch screen with the electronic pen and touching of a touch key with the same hand while continuing to hold the pen. For instance, the user can be prompted to make the sequential touches between the key 168*a* or 168*b* and touch screen 190 regions while the controller detects and monitors hovering points each time the keys 168*a*, 168*b* are touched in the sequence. The hovering points are then used to determine suitable boundaries for the areas 190*a*, 190*b*. One example sequence is as follows: the user is prompted to touch the menu key five times, followed by the number 1 on the touch screen; the back key five times; number 3 on the touch screen; the menu key five times; the number 5 on the touch screen; the back key five times, number 7 on the touch screen, the menu key five times, number 9 on the touch screen, and the back key five times. Here, the user touches the touch screen with the electronic pen and touches the touch key with the same hand while continuing to hold the electronic pen. A result of the simulation can be the hovering points detected as shown in FIG. 8 (discussed below).

Figure 7B:
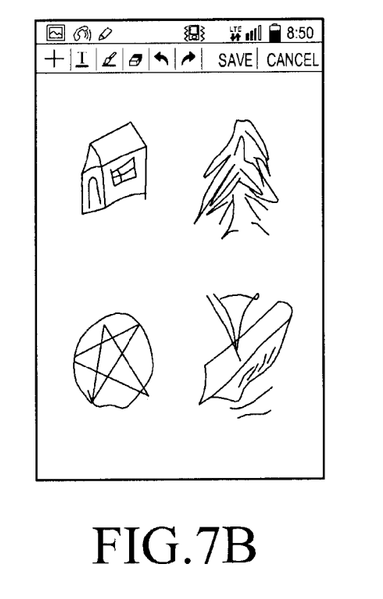

FIG. 7B illustrates another example simulation to measure unintentional hovering inputs while the keys 168*a*, 168*b* are intentionally touched. The user is first prompted to draw a total of four drawings with the electronic pen. Each time one drawing is finished, the user is prompted to touch the menu key 168*a* and the back key 168*b* each five times, while holding the electronic pen in the same hand.

Figure 8:
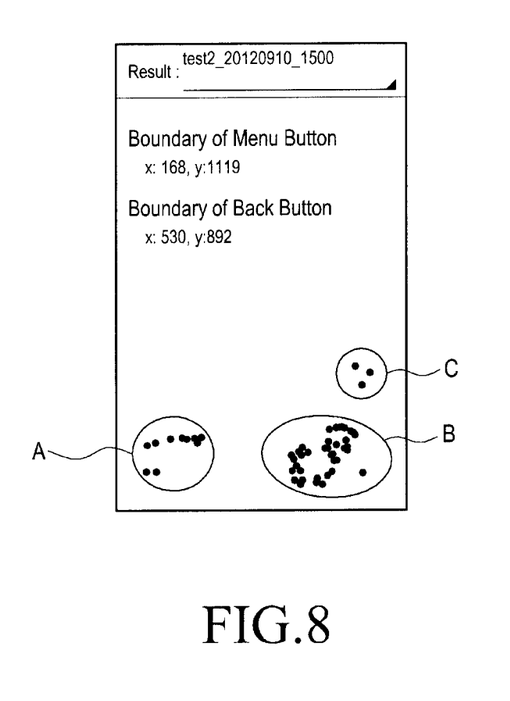
FIG. 8 is an exemplary view illustrating the hovering recognition area of the electronic pen, when the user hand touches a touch key while holding the electronic pen in the same hand as illustrated in FIGS. 7A and 7B according to an embodiment of the present invention.

FIG. 8 shows an example result of the simulations of FIG. 7A and/or FIG. 7B. In the illustration, part A of the touch screen is marked with hovering-recognized points of the electronic pen generated when the user touches the left key 168*a*, while part B of the touch screen is marked with hovering-recognized points of the electronic pen generated when the user touches the right touch key 168*b* in the above simulations. It is seen that the two regions A and B are segregated. Thus it may be concluded that a hovering-recognized part of the electronic pen in the case of a hand touch on the menu key 168*a* and a hovering-recognized part of the electronic pen in the case of a hand touch on the back key 168*b* are mutually exclusive. It is noted, there are typically hovering recognized points outside the two parts A and B, as in part C. Minor errors can thus be expected for those instances in which hovering is recognized outside expected areas. In some embodiments, additional areas such as an area encompassed by the part C can be defined as areas for which touch keys 168*a* and/or 168*b* should be activated (and hovering ignored when a key is touched while hovering is detected).

The two areas, that is, the first area 190*a* and the second area 190*b* may be defined at the lower portions of the touch screen 190 in the vicinity of the left and right touch keys 168*a* and 168*b* based on the above-described first and second simulations.

That is, the first area 190*a* illustrated in FIG. 5 is a part in which when the user touches the left touch key 168*a* with the same hand holding the electronic pen, a hovering event of the electronic pen is recognized. Therefore, the left touch key 168*a* is set not to be deactivated, upon detection of a hovering event of the electronic pen in the first area 190*a*, in order to solve the problem of deactivation of the left touch key 168*a* while intentional touches of key 168*a* occur.

The second area 190*b* illustrated in FIG. 5 is a part in which when the user touches the right touch key 168*b* with the same hand holding the electronic pen, a hovering event of the electronic pen is recognized. Therefore, the right touch key 168*b* is set not to be deactivated, upon detection of a hovering event of the electronic pen in the second area 190*b*, in order to solve the problem of deactivation of the right touch key 168*b* while intentional touches of key 168*b* occur.

Figure 9:
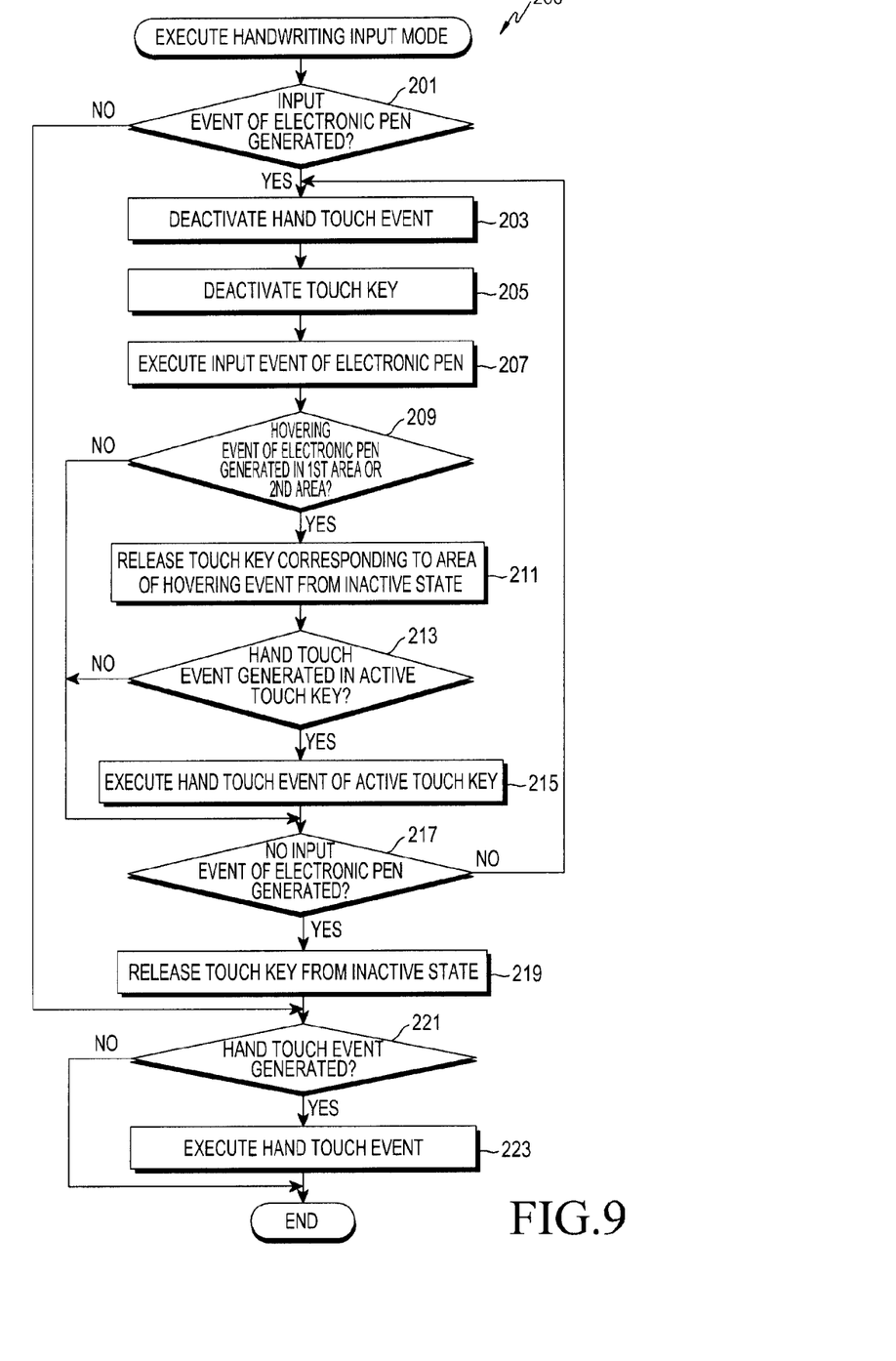
FIG. 9 is a flowchart illustrating a method for controlling a touch-key operation according to an embodiment of the present invention.

FIG. 9 is a flowchart illustrating a method, 200, for controlling a touch-key operation in electronic device 100 according to an embodiment of the present invention. In FIG. 9, when a user writes a note on the touch screen with the electronic pen, that is, when the electronic pen generates a touch event or a hovering event, a hand touch event on the touch screen and a touch-key operation are deactivated and thus only an operation corresponding to the input of the electronic pen is performed. However, when a hovering event occurs in a predetermined area of the touch screen from the electronic pen while the user is touching a touch key corresponding to the predetermined area with his hand, the touch key is activated. More specifically, under this condition, a touch key corresponding to the predetermined area is released from inactive state and thus activated.

In other words, upon occurrence of a hovering event on the touch screen, the generation area of the hovering event is identified and a touch key corresponding to the identified area is activated, while a touch key corresponding to an area other than the identified area is deactivated in the operation of FIG. 9.

Referring to FIGS. 5 and 9, it is first determined whether an input event has been generated from the electronic pen on any portion of the touch screen in a handwriting input mode or other electronic pen input mode in step 201. For instance, an electronic pen input mode may be initiated automatically after the electronic pen 105 is extracted from a housing of device 100, or the mode may be initiated via a predetermined input command from the user. The input event of the electronic pen may be a hovering event or touch event of the electronic pen. If no input event is generated, the procedure jumps to step 221.

If a pen input event is generated, then a hand touch event (i.e., hand touch detection on touch screen 190) is deactivated in step 203 and touch keys are deactivated in step 205. For example, when the user writes a note with the electronic pen, the user's hand may partially touch the touch screen 190. Because the hand touch event is not an intended gesture, the hand touch event is deactivated to prevent an operation incurred by the hand touch event. In addition, the user's pen writing hand may partially touch a touch key 168 inadvertently. In this case, the touch key is also at least temporarily deactivated to prevent the hand touch event from incurring an operation corresponding to the touch key. In step 207, an operation corresponding to the recognized input event of the electronic pen, that is, a hovering event or touch event of the electronic pen is performed.

Next, at step 209, it is determined whether the electronic pen has generated a hovering event in the first area 190*a* or the second area 190*b* illustrated in FIG. 5. If no, the procedure jumps to step 217. If yes, then at step 211, a touch key 168*a* or 168*b* corresponding to an area in which the hovering event of the electronic pen has been generated is released from the inactive state. That is, upon generation of the hovering event in the first area 190*a*, the left touch key 168*a* corresponding to the first area 190*a* is released from the inactive state. Upon generation of the hovering event in the second area 190*b*, the right touch key 168*b* corresponding to the second area 190*b* is released from the inactive state.

Next, in step 213, it is determined whether a hand touch event has been generated in the active touch key. If so, an operation corresponding to the hand touch event in the active touch key is performed in step 215. If not, then at step 217, it is determined whether an input event has been generated from the electronic pen, that is, if a hovering event or touch event has been generated from the electronic pen. If an input event has not been generated from the electronic pen, the procedure goes to step 219. Upon generation of a hovering event or touch event from the electronic pen, step 203 is repeated. In step 219, the touch keys are released from the inactive state, that is, activated.

Thereafter, it is determined whether a hand touch event has been generated in step 221. Upon generation of a hand touch event, the procedure goes to step 223 and otherwise, the procedure ends. An operation corresponding to the hand touch event is performed in step 223.

In the above description of the method of FIG. 9, it was assumed that any input event in step 201 leads to a deactivation of a touch key in step 205. In an alternative process, step 201 only determines if an input event of the electronic pen 105 occurs in an area of the touch screen 190 outside the areas 190*a*, 190*b*.

Figure 10:
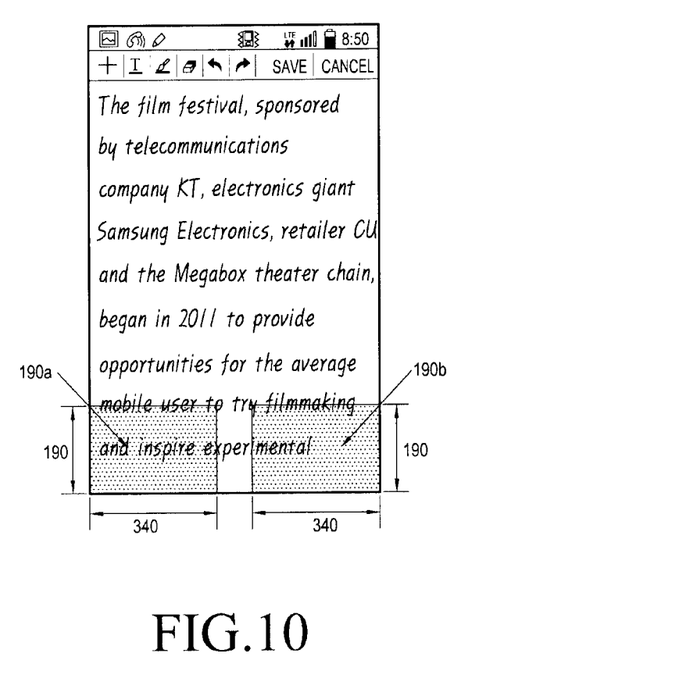
FIG. 10 is an exemplary view illustrating a result of controlling a touch-key operation according to an embodiment of the present invention.

FIG. 10 illustrates an exemplary result of controlling a touch-key operation according to an embodiment of the present invention. Referring to FIGS. 5 and 10, while the user is writing a note, if proximity (i.e., a hovering event) of the electronic pen to the first area 190*a* is recognized, the left touch key 168*a* is activated and if proximity of the electronic pen to the second area 190*b* is recognized, the right touch key 168*b* is activated.

As is apparent from the above description, a method and apparatus for controlling a touch-key operation according to the present invention can enhance user convenience in applying touch inputs. Specifically, while maintaining the effects of the conventional technology of deactivating a hand touch during a touch input of an electronic pen over a majority of the touch screen surface, embodiments of the present invention can activate a touch key when hovering is recognized in a predetermined area of the touch screen proximate the touch key. Since the predetermined area is designed to correspond to an area where an inadvertent pen hovering event typically occurs while an intentional hand touch is made on a touch key, an operation corresponding to the intentional touch on the touch key is properly executed. Thus the user is not inconvenienced by non-execution of the touch, as occurs in the related art approach.

Methods and apparatus for controlling a touch-key operation according to an embodiment of the present invention can be implemented as described above. While the present invention has been described according to a specific embodiment, many other embodiments can be practiced and many variations and modifications can be made.

For example, while the dimensions of the first and second areas are shown in FIG. 10 as 340×190, the dimension of each area may be changed in the fabrication process of a portable terminal or by a user setting.

In addition, while two touch keys are provided and two areas are predefined on a touch screen according to the number of the touch keys in the afore-described embodiment, the number of touch keys may be one or three or more and thus one or three or more areas may be predefined on the touch screen according to the number of touch keys. While the touch keys are disposed under the touch screen in the description, they may be arranged at any positions outside the touch screen. Further, touch key(s) 168 may be formed in dedicated outside areas of the touch screen itself; in this case, the inside area of such an integrated touch screen is considered equivalent to be the touch screen 190 in the operations described above.

It will be understood that the embodiments of the present invention can be implemented in hardware, software, or a combination thereof. The software may be stored in a volatile or non-volatile memory device like a ROM irrespective of whether data is deletable or rewritable, in a memory like a RAM, a memory chip, a device, or an integrated circuit, or in a storage medium to which data can be recorded optically or magnetically and from which data can be read by a machine (e.g. a computer), such as a CD, a DVD, a magnetic disk, or a magnetic tape. Further, a memory that can be included in the portable terminal is an example of a machine-readable storage medium suitable for storing a program or programs including commands to implement the embodiments of the present invention. Accordingly, the present invention in some embodiments includes a program having a code for implementing the apparatuses or methods defined by the claims and a storage medium readable by a machine that stores the program. The program can be transferred electronically through a wired or wireless medium, and a communication signal containing the program instructions can be transmitted over such media.

While exemplary embodiments of the invention have been particularly shown and described, it will be understood by those of ordinary skill in the art that various changes in form and details may be made therein without departing from the spirit and scope of the invention as defined by the following claims.

What is claimed is:

1. A method for controlling a touch-key operation in an electronic device having a touch screen including a touch panel for receiving a hand touch, a touch panel for receiving an electronic pen's input, and a touch key which is configured separately from the touch screen, comprising:
   deactivating the touch key, upon generation of an input event on the touch screen from the electronic pen; and
   activating the touch key when the input event is no longer being generated and when a hovering event is being generated from the electronic pen in a predetermined area of the touch screen associated with the touch key, wherein the predetermined area is a first area or a second area of the touch screen and the associated touch key is released from an inactive state.

2. The method of claim 1, wherein the input event generated from the electronic pen is a hovering event of the electronic pen or a touch event of the electronic pen.

3. The method of claim 1, wherein the input event comprises a hovering event or a touch event, and when a hovering event by the electronic pen is detected for a predetermined time while a touch event by a hand touch is generated in a predetermined area of the touch screen associated with the touch key, the detected hovering event is ignored.

4. The method of claim 1, wherein the touch key is a first touch key, the predetermined area is a first predetermined area, the electronic device includes at least one second touch key outside the touch screen area, the deactivating comprises deactivating all touch keys upon generation of the input event, and at least one second touch key is activated when the input event is no longer generated and when a hovering event is generated from the electronic pen in at least one second predetermined area of the touch screen associated with the at least one second touch key.

5. The method of claim 1, wherein the predetermined area of the touch screen is an area proximate the touch key.

6. The method of claim 1, further comprising executing a predetermined function corresponding to the activated touch key, upon generation of a hand touch event in the activated touch key, after activating the touch key.

7. The method of claim 1, further comprising entering a calibration mode to define boundaries of the predetermined area based upon hovering recognition measurements made in response to intentional touches with the user's hand on the touch key, the intentional touches being made responsive to prompts in the calibration mode, while the electronic pen is concurrently held in the same hand.

8. An apparatus for controlling a touch-key operation of an electronic device, comprising:
- a touch screen including a touch panel for receiving a hand touch and a touch panel for receiving an electronic pen's input;
- a touch key configured separately from the touch screen for performing a predetermined function in response to a touch input; and
- a controller configured to control the touch screen and a the function of the touch key, deactivate the touch key upon generation of an input event on the touch screen from the electronic pen; and activate the touch key when the input event is no longer being generated and when a hovering event is being generated from the electronic pen in a predetermined area of the touch screen associated with the touch key, wherein the predetermined area is a first area or a second area of the touch screen and the associated touch key is released from an inactive state.

9. The apparatus of claim 8, wherein the input event generated from the electronic pen is a hovering event of the electronic pen or a touch event of the electronic pen.

10. The apparatus of claim 8, wherein the input event comprises a hovering event or a touch event, and when the hovering event by the electronic pen is detected for a predetermined time, while a touch event by a hand touch is generated in a predetermined area of the touch screen associated with the touch key, the detected hovering event is ignored.

11. The apparatus of claim 8, wherein the touch key is a first touch key, the predetermined area is a first predetermined area, the electronic device includes at least one second touch key outside the touch screen area, the deactivating comprises deactivating all of the touch keys upon generation of the input event, and at least one second touch key is activated when the input event is no longer generated and when a hovering event is generated from the electronic pen in at least one second predetermined area of the touch screen corresponding to the at least one second touch key if the at least one touch key is two or more touch keys, the controller deactivates all of the two or more touch keys, upon generation of the input event from the electronic pen.

12. The apparatus of claim 8, wherein the predetermined area of the touch screen is an area proximate the touch key.

13. The apparatus of claim 8, wherein upon generation of a hand touch event in the activated touch key, the controller controls execution of a predetermined function corresponding to the activated touch key.

14. The apparatus of claim 8, wherein the controller activates a calibration mode to define boundaries of the predetermined area based upon hovering recognition measurements made in response to intentional touches with the user's hand on the touch key, the intentional touches being made responsive to prompts in the calibration mode, while the electronic pen is concurrently held in the same hand.

15. A method for controlling a touch-key operation in an electronic device having a touch screen and at least one touch key outside the touch screen, comprising:
- defining a predetermined area of the touch screen which is associated with the touch key, wherein the predetermined area is a first area or a second area of the touch screen and the associated touch key is released from an inactive state;
- deactivating the touch key upon generation of an input event from an electronic pen outside the predetermined area of the touch screen; and
- activating the touch key when the input event is no longer being generated and when a hovering event is being generated from the electronic pen in the predetermined area of the touch screen.

16. The method of claim 15, wherein the input event generated from the electronic pen is a hovering event of the electronic pen or a touch event of the electronic pen.

17. The method of claim 15, wherein if the touch key is two or more touch keys, the deactivation comprises deactivating all of the two or more touch keys, upon generation of the input event from the electronic pen.

\* \* \* \* \*